Jan. 6, 1925.  
W. J. CRAIG  
STEERING MECHANISM FOR VEHICLES  
Filed May 15, 1922  
1,521,758  
2 Sheets-Sheet 2
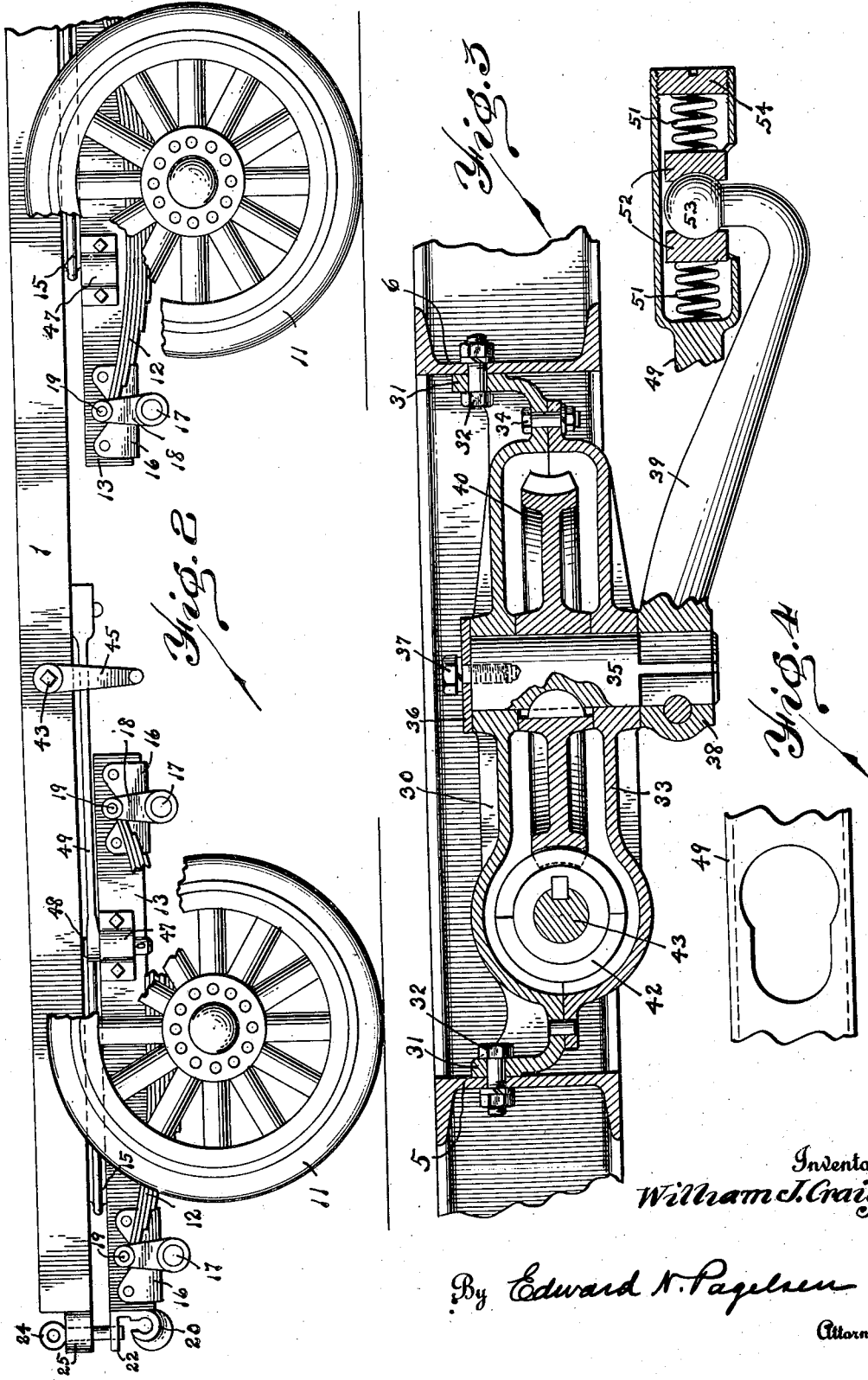

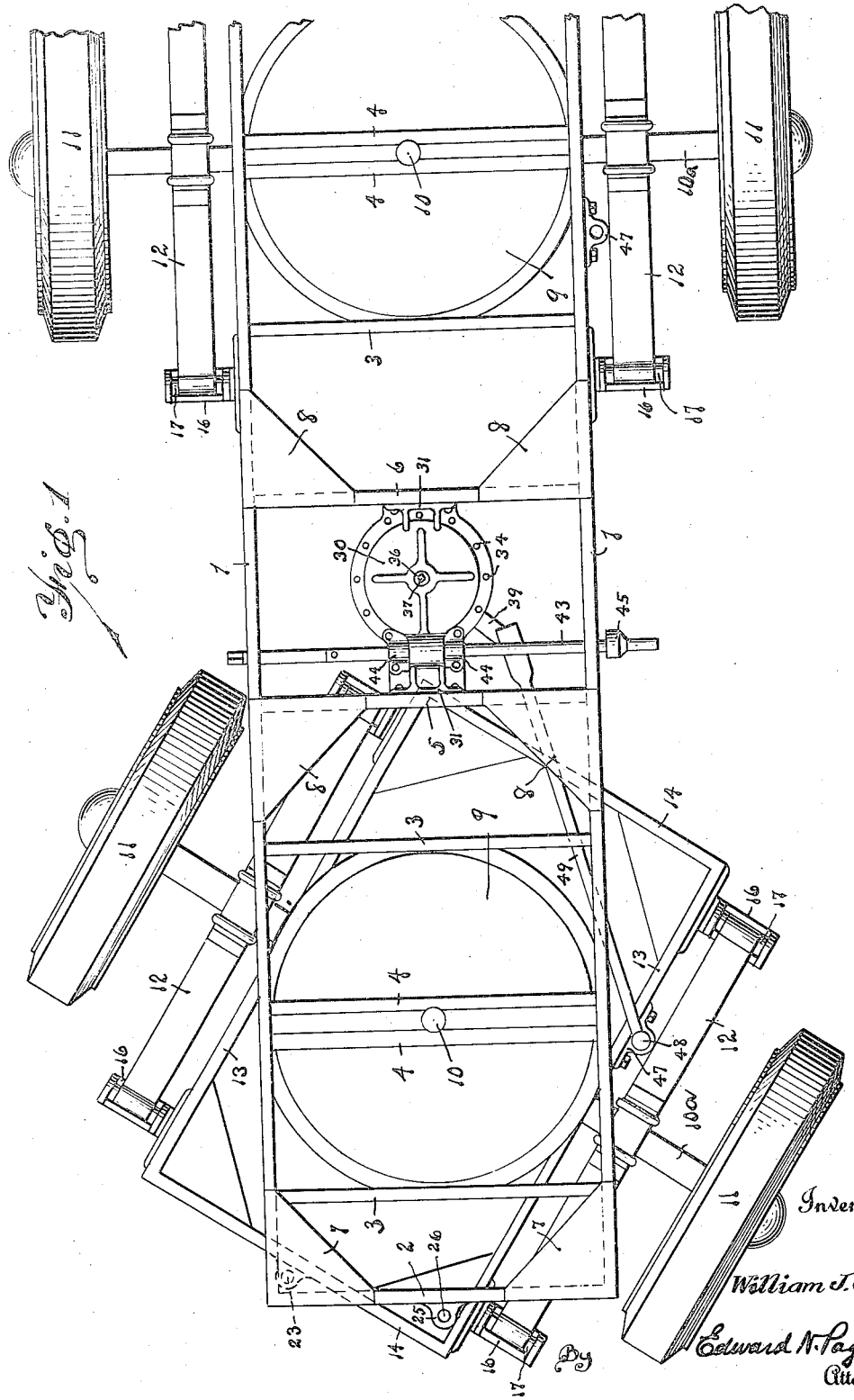

Patented Jan. 6, 1925.

1,521,758

UNITED STATES PATENT OFFICE.

WILLIAM J. CRAIG, OF DETROIT, MICHIGAN, ASSIGNOR TO FRUEHAUF TRAILER COMPANY, OF DETROIT, MICHIGAN, A CORPORATION OF MICHIGAN.

STEERING MECHANISM FOR VEHICLES.

Application filed May 15, 1922. Serial No. 561,090.

*To all whom it may concern:*

Be it known that I, WILLIAM J. CRAIG, a citizen of the United States, and residing at Detroit, in the county of Wayne and State of Michigan, have invented a new and Improved Steering Mechanism for Vehicles, of which the following is a specification.

This invention relates to means for swinging the front or hind wheels, as may be desired, of vehicles which are provided with trucks embodying dead axles and fifth wheels, and its object is to provide a device of this character which can be connected to either the front or hind trucks at will, which will be simple in construction and powerful in operation, and which will not interfere with the operation or loading of the vehicle.

This invention consists, in combination with a trailer body and trucks under the ends thereof which trucks are connected to the body by means of king bolts and fifth wheels, of a steering mechanism mounted on the body between the trucks, and a connecting member adapted to connect either truck to the steering mechanism, means being provided for locking the other truck from turning.

This invention further consists in the details of construction illustrated in the accompanying drawings and particularly pointed out in the claims.

In the drawings, Fig. 1 is a plan of a trailer equipped with my improved steering mechanism. Fig. 2 is a side elevation thereof. Fig. 3 is a central longitudinal vertical section of the steering mechanism. Fig. 4 is a detail of a connecting link.

Similar reference characters refer to like parts throughout the several views.

Many vehicles are provided with fifth wheels and dead axles at their front ends whereby the front ends may be steered, the hind wheels being mounted on rigid axles. When such a vehicle is to be pushed backward to position it for loading or unloading, great difficulty is often experienced in making it travel in the desired direction. The present invention is embodied in a vehicle having fifth wheels and dead axles at both ends, and steering mechanism therefor, so that the vehicle can be operated equally well in either direction, means being provided for locking either truck centrally while the other truck is being turned.

The accompanying drawings are largely diagrammatic and conventional because the construction of each of the various parts of the vehicle, excepting the steering mechanism, involves no invention, only well known details being shown. The frame of the vehicle embodies side bars 1, cross bars 2, 3, 4, 5 and 6, and stiffening plates 7 and 8. To the frame are connected the upper parts 9 of fifth wheels through which the king bolts 10 extend.

Each truck embodies an axle 10ª, wheels 11, springs 12 and a frame composed of side bars 13 and end bars 14. The lower parts 15 of the fifth wheels connect to this frame. On the frame are the brackets 16 for the pins 17 which carry the shackles 18, bolts 19 connecting these shackles to the ends of the springs 12. A draw hook 20 is connected to one end bar 14 of the truck frame, and a plate 22 which extends from this hook has a hole 23 adapted to receive the centering pin 24 carried by a bracket 25 attached to the end cross bar 2 of the main frame, this bracket having a hole 26 to receive this pin. When the holes 23 and 26 are in alinement and the pin 24 is in position, the wheels 11 of that truck track parallel to the line of the vehicle.

A plate 30 (Fig. 3) extends between the bars 5 and 6 of the main frame and has flanges 31 at its ends adapted to be attached to the bars 5 and 6 by bolts 32. This plate supports a lower plate 33 by means of bolts 34 and these two plates carry a shaft 35 which may be held in position by a washer 36 and screw 37 and the hub 38 of a crank arm 39. On this shaft is a worm wheel 40 which meshes with a worm 42 on the shaft 43 carried by the bearings 44 (Fig. 1) formed on these plates. A crank handle 45 may be slipped onto either of the squared ends of this shaft 43 and the turning of this shaft 43 in either direction turns the worm wheel 40 and swings the crank arm 39 accordingly.

Attached to a side bar 13 of each truck is a bracket 47 adapted to receive a pin 48 carried by one end of a drag link 49. The other end of this connects to the outer end of the crank 39, preferably in the manner shown in Fig. 3, where the end of this link 49 is shown to be cylindrical and enclosing springs 51 and bearing blocks 52 engaging the ball 53 on the end of this arm, the pressure being determined by the screw plug 54.

When the vehicle is to be pushed in either direction (to the left in Fig. 1), the centering pin 24 is removed from the end of the main frame in which the vehicle is to move and positioned as above described in the other end. The connecting link 49 is now swung so that the pin 48 in its free end may enter the vertical hole in the bracket 47 on the leading truck. The handle 45 is now slipped onto that end of the shaft 43 which is the more convenient, and this shaft, the worm 42 and the worm wheel 40 are turned to swing the crank arm 39 and the leading truck to steer the vehicle in the desired direction.

The details of construction and the proportions of these various parts may all be changed by those skilled in the art without departing from the spirit of my invention as set forth in the following claims.

I claim:—

1. A vehicle having fifth wheels at either end and a wheeled truck connected to each fifth wheel, a vertical shaft mounted substantially half way between said fifth wheels, means to rotate the shaft in either direction, a crank arm attached to said shaft, and a thrust bar connected to the end of the crank arm and adapted to connect to either of said trucks whereby the trucks may be swung in either direction.

2. A vehicle having fifth wheels at either end and a wheeled truck connected to each fifth wheel, a vertical shaft mounted substantially half way between said fifth wheels, means to rotate the shaft in either direction, a crank arm attached to said shaft, a thrust bar connected to the end of the crank arm and adapted to connect to either of said trucks whereby the trucks may be swung in either direction, and means to lock the other truck from swinging.

3. A vehicle having wheeled trucks at either end adapted to swing about vertical centers, brackets attached to said trucks and provided with vertical holes, a rigid bar extending from the middle of the vehicle and having at its outer end a downwardly extending pin adapted to seat in the hole in the bracket on either truck, and means at the middle of the vehicle engaging the inner end of said bar and adapted to move said bar to cause the truck to which it is attached to swing in either direction at will.

4. A vehicle having wheeled trucks at either end adapted to swing about vertical centers, brackets attached to said trucks and provided with vertical holes, a rigid bar extending from the middle of the vehicle and having at its outer end a downwardly extending pin adapted to seat in the hole in the bracket on either truck, means at the middle of the vehicle engaging the inner end of said bar and adapted to move said bar to cause the truck to which it is attached to swing in either direction at will, and means to lock the other truck from swinging.

5. A vehicle having a frame and a wheeled truck pivoted to either end of the frame, a transverse shaft mounted in the frame, means to turn the shaft, a worm mounted on the shaft, a worm wheel meshing with the worm, a crank arm connected to the worm wheel, a bracket on each truck, a connecting device adapted to be attached at one end to either bracket at will and attached at the other end to said crank arm, and means mounted on the vehicle frame to support the transverse shaft, worm and worm wheel.

6. A vehicle comprising a frame, a king bolt and the upper part of a fifth wheel at each end of the frame, a wheeled truck at each end of the frame and a lower portion of a fifth wheel on each truck to co-operate with the upper parts of the truck, a bracket on each truck, a steering device on the vehicle frame between the trucks embodying a vertical shaft and an arm thereon and a link connected to said arm and common to both said trucks adapted to connect the steering device to either of said trucks as may be desired to swing the same on its king bolt, and means to prevent the other truck from swinging relative to the vehicle frame.

WM. J. CRAIG.